March 7, 1944.　　　L. E. EGEDAL　　　2,343,757
FLOUR MILL
Filed July 19, 1940　　　4 Sheets-Sheet 3

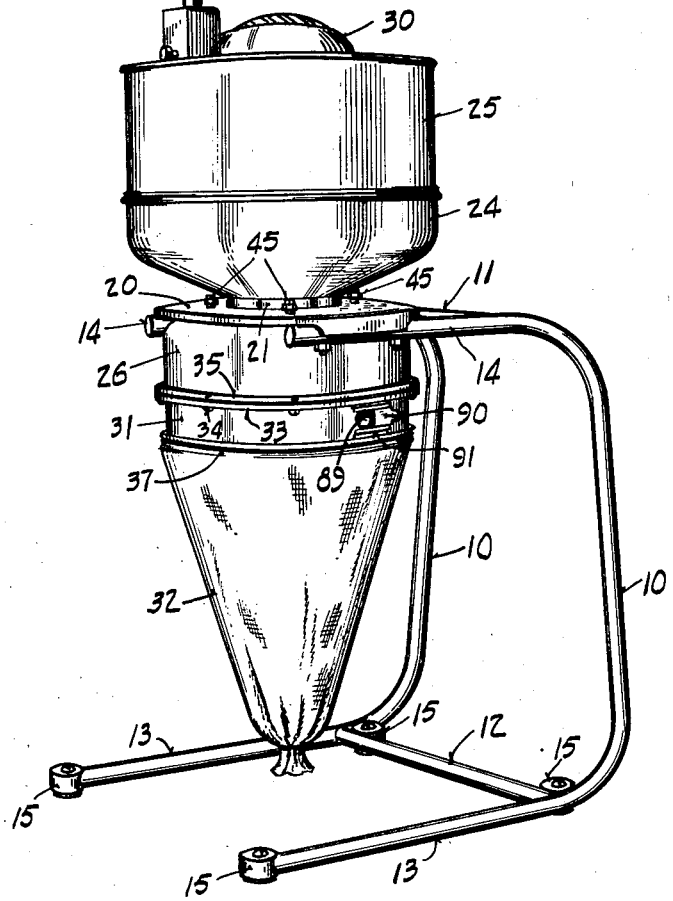
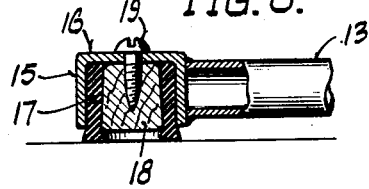

Lawrence E. Egedal
INVENTOR.

BY
ATTORNEY.

March 7, 1944.  L. E. EGEDAL  2,343,757
FLOUR MILL
Filed July 19, 1940  4 Sheets-Sheet 4

Lawrence E. Egedal
INVENTOR.

BY
ATTORNEY.

Patented Mar. 7, 1944

2,343,757

UNITED STATES PATENT OFFICE 2,343,757

FLOUR MILL

Lawrence E. Egedal, Milwaukee, Wis.

Application July 19, 1940, Serial No. 346,243

13 Claims. (Cl. 83—7)

This invention relates to the art of milling.

This application is a continuation in part of my prior copending application, Serial No. 79,679, filed May 14, 1936.

An object of the present invention is to provide a novel method and machine for the milling of fine flour from the whole grain and particularly adapted for use in bakeries, restaurants, hotels, grocery stores and the like, thus making it possible for the consumer to obtain flour freshly milled. No flour mill heretofore available is adapted for such use.

Flour mills are ordinarily rather large and cumbersome and require considerably more power to operate than is ordinarily available in establishments of the character above mentioned; and milling methods heretofore employed commonly require repeated grinding and bolting in order to obtain flour of the fineness and uniformity required.

Another object of the present invention is to provide a flour mill and method capable of producing uniformly fine flour in one operation with minimum power requirements, and involving apparatus requiring little space and readily transportable to any location desired. This I have accomplished by utilizing repeated dashing impingement between relatively moving grain or the like and abrasive areas to reduce the grain to flour form, rather than by pressure grinding between opposed abrasive areas as is the universal custom in prior mills.

Other more specific objects and advantages will appear, expressed or implied, from the following description of a flour mill constructed and operated in accordance with the present invention.

In the accompanying drawings:

Figure 1 is a perspective view of a flour mill embodying the present invention.

Fig. 8 is a detail sectional view of a mounting foot of the mill supporting frame.

Figure 2:
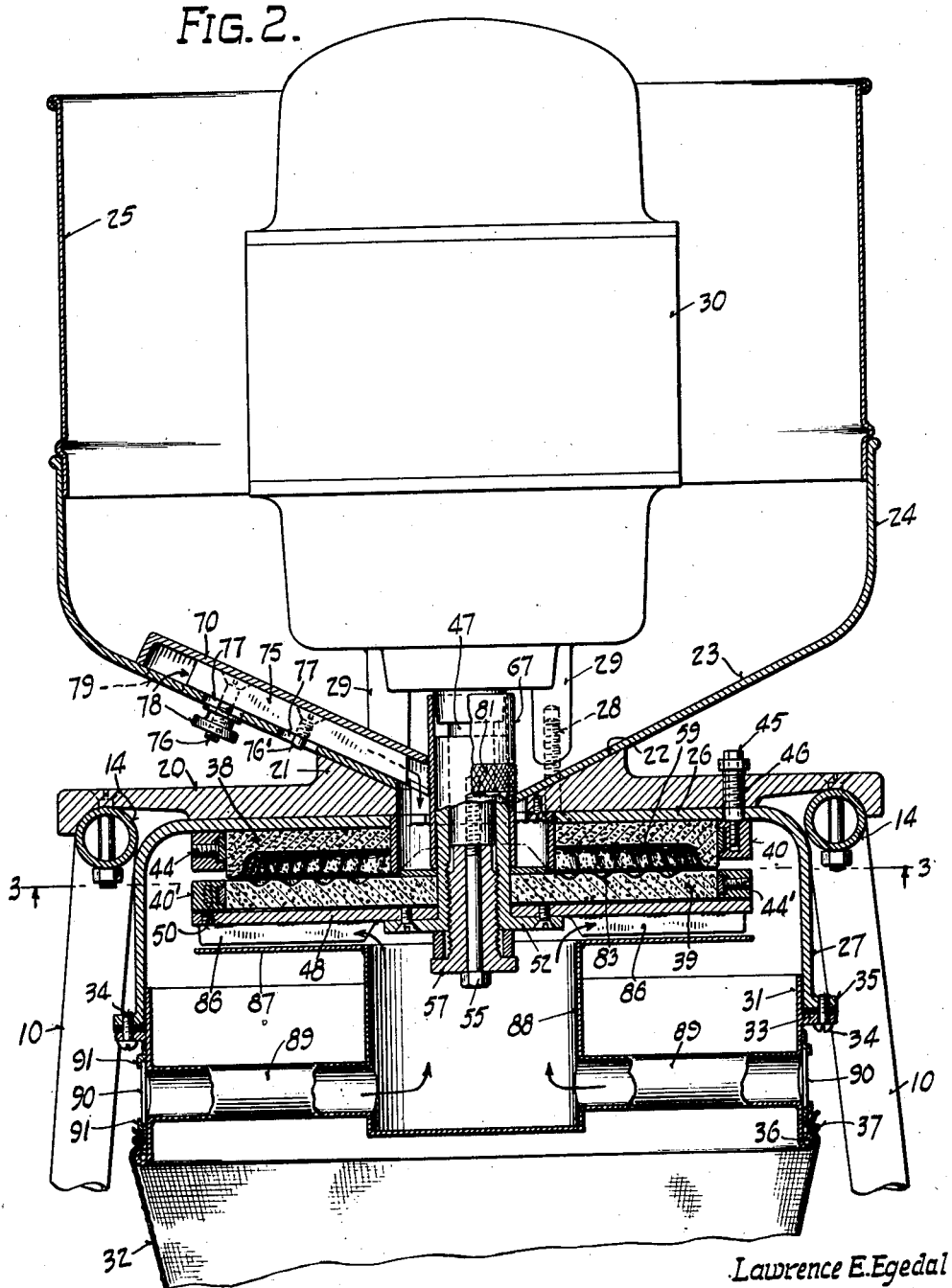
Fig. 2 is a vertical sectional view on a larger scale.

The mill selected for illustration is shown mounted upon an appropriate support comprising a pair of seamless tubes 10—10 rigidly connected by upper and lower cross tubes 11 and 12 and bent to form a horizontal base 13 and a pair of parallel substantially horizontal supporting arms 14. The base 13 of the support is shown equipped with four feet 15, each comprising an inverted socket member 16 embracing a cylindrical rubber gasket 17 which projects through the bottom thereof and which is retained by a tapered plug 18 removably fixed in the member 16 by a screw 19, all as indicated particularly in Figs. 1 and 8.

The arms 14 of the support are bolted or otherwise fixed to and beneath the opposite ends of an appropriate horizontal mounting plate 20 having an upstanding central boss 21 fashioned to provide a conical seat 22 for the inwardly sloping bottom 23 of a hopper 24. The hopper shown is equipped with a detachable cylindrical extension 25. The plate 20 also supports an inverted sheet metal housing 26 attached to the under side thereof and having a depending cylindrical wall 27 concentrically disposed with respect to the hopper 24.

The housing 26 and hopper 24 are secured to the mounting plate 20 by appropriate means, such as screws 28, which extend upwardly through the top of the housing 26, through the boss 21, through the hopper bottom 23, and into lugs 29 constituting supporting feet for a conventional electric motor 30 vertically disposed centrally of and within the hopper.

A sheet metal extension ring 31, attached to and depending from the housing 26, provides support for an appropriate flour receiving bag 32 preferably formed of tightly woven fabric. In this instance the ring 31 is provided near its upper edge with a mounting flange 33 attached by screws 34 or otherwise to a mating flange 35 on the housing wall 27. The upper open end of the bag 32 is shown applied over the lower beaded edge 36 of the ring 31 and releasably secured in place by an appropriate encircling cord or band 37.

In the machine shown, the milling operation is performed primarily by high velocity circulation of the material within a relatively shallow confining chamber formed by and between two circular upper and lower stones 38 and 39 arranged within the housing 26. The stones are encircled and reinforced by rigid mounting rings 40 and 40' of like construction. Each mounting ring is provided with a channel 41—41' on its inner periphery which snugly embraces a resilient steel ring 42—42' which is preferably split, as at 43 (Fig. 4), to permit contraction thereof against the periphery of the stone. Each resilient ring 42—42' is forcibly pressed into gripping engagement with its encircled stone by a series of screws 44—44' which extend radially through the coacting mounting ring and against the back or outer periphery of the resilient ring.

In the machine shown the upper stone 38 is non-rotary. It is adjustably supported from the mounting plate 20 through a series of bolts 45 each of which extends downwardly through a bushing 46 and into screw threaded engagement with the mounting ring 40. Each bushing 46 is in screw threaded engagement with the mounting plate 20 and is provided with an appropriate tool-engaging head 46' by which it may be rotated and thus vertically adjusted with respect to the plate 20. The upper non-rotating stone 38 may thus be accurately adjusted with respect to the lower stone 39 by independent adjustment of the several bushings 46, after which the several bolts 45 are tightened to maintain the adjustment thus established.

The lower stone 39 is supported by the armature shaft 47 of the motor 30 for high speed rotation therewith, and in this instance its mounting ring 40' is adjustably attached to a carrier disk 48 through a series of screws 49 which extend vertically through the disk 48 and into screw threaded engagement with the ring. A series of vertical set screws 50 extending through the disk 48 and against the under side of the ring 40', cooperate with the screws 49 to accurately determine the position of the stone 39 with respect to the disk. That is to say, by loosening any of the screws 49 and tightening an adjacent set screw 50, the adjacent portion of the stone 39 may be elevated, or by loosening that set screw 50 and tightening the adjacent screw 49 that portion of the stone may be lowered. The lower rotating stone 39 may thus be accurately adjusted with respect to the upper stationary stone 38.

The carrier disk 48 is supported from the motor shaft 47 preferably through vertically adjustable means so as to permit raising and lowering of the lower stone 39, as a unit, with respect to the upper stone 38. The means shown for this purpose includes a sleeve 51 which extends upwardly through the disk 48 and stones and which is provided at its lower end with a flange 52 forming a seat for the disk 48. The disk 48 is fixed to the flange 52 by screws 53 or the like. The sleeve is supported by a bushing 54 in screw threaded engagement therewith, and a bolt 55, extending upwardly through the bushing and into screw threaded engagement with the shaft 47, supports the bushing. The bolt 55 is normally drawn tight so that the upper end of the bushing bears against the lower end of the shaft, and an accurately dimensioned spacer sleeve 56 between the head 57 of the bushing and the bottom of the flange, determines the elevation of the disk 48. A key 58, attached to and within the sleeve 51 and slidable in an appropriate key-way in the shaft 47, insures rotation of the sleeve 51, disk 48, and stone 39 with the shaft 47.

The upper non-rotating stone 38 is hollowed out to form a shallow chamber 59 bounded by an upright peripheral wall 60, the lower rotating stone 39 forming the bottom of the chamber and cooperating with the upper stone to form a restricted peripheral outlet gap 61 encircling the bottom of the chamber, the gap 61 constituting a mere crevice of minute depth such as to prevent escape of any but very finely divided material from the chamber. The opposed upper and lower surfaces of the gap coact to provide a finish grinding zone by which any particles that may enter the gap from the chamber are promptly reduced to very fine form. As above noted, however, the material is ordinarily reduced to very fine form within the chamber 59 before entering the gap 61.

The material enters the chamber 59 from the hopper 24 preferably through a central annular feed channel 62 surrounding the rotating sleeve 51. This channel is bounded by a stationary cylindrical shell 63, which is attached to the under side of the mounting plate 20 by screws 64 or the like, and which extends downwardly through the top of the housing 26 and through the upper stone 38 to the lower stone 39. The shell 63 is provided with a port 65 through which the material enters the chamber 59. A thin metal annulus 66, resting upon and rotatable with the lower stone 39, constitutes the floor of the channel 62, and the inner wall of the channel is formed by a vertical cylindrical shell 67 surrounding the sleeve 51 and extending upward from the lower rotary stone 39 to the motor. The shell 67 is tightly fitted to the sleeve 51 for rotation thereby with respect to the hopper, the hopper bottom 23 having a central opening 68 fitting rather closely about the shell 67.

Figure 6:
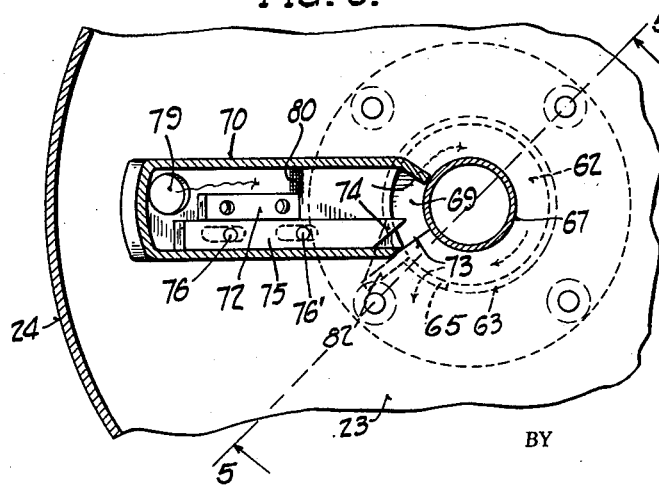
Fig. 6 is a fragmentary sectional view of the hopper, illustrating particularly the feed control chute in the bottom thereof.
Figure 7:
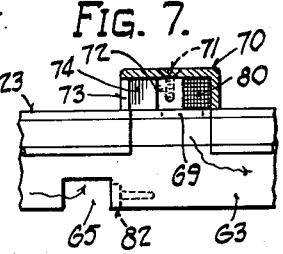
Fig. 7 is a developed view of the feed chute and parts associated therewith.

Mechanism is preferably provided for regulating the admission of material from the hopper 24 to the feed channel 62. In the machine shown, this mechanism includes a port 69 formed in the hopper bottom 23 adjacent the rotating shell 67 and covered by the inner end of an elongated housing 70 seated upon the hopper bottom and extending radially thereof. The housing 70 is detachably fixed by screws 71 or otherwise to a block 72 (Fig. 6) fixed to the hopper bottom. The housing 70 is closed except for an inlet port 73 in one side thereof adjacent the port 69 in the hopper bottom, the port 73 being controlled by a gate 74 constituting the end of a slide bar 75 guided between the block 72 and a side wall of the housing. The bar 75 is also guided by longitudinally spaced screws 76—76' therein engaged in slots 77 in the hopper bottom. Screw 76 is extended to receive a nut 78 which may be tightened to fix the bar 75 in any desired position of adjustment. Another port 79 in the hopper bottom insures free admission of air to and through the housing 70, through a screen 80 in the housing, through the feed channel 69, and through the chamber 59 for a purpose which will later appear.

The arrangement is such that the material in the bottom of the hopper is agitated and advanced toward the housing inlet port 73 by the rotating shell 67, the shell being preferably knurled, as at 81, for that purpose. The material passes through the port 73 at a rate dependent upon the setting of the bar 75, and thence passes through the port 69 into and through the annular feed channel 62 and ultimately enters the milling chamber 59 through the port 65.

The material entering the chamber 59 is engaged by the rapidly rotating lower stone 39 and thrown about at high velocity therein, so that the fragments thereof repeatedly impact and rebound against and from the stationary and rapidly moving abrasive surfaces of the upper and lower stones. This results in an effective abrasive action, breaking down and reducing the fragments of the material into finely divided form, the latter escaping through the restricted outlet 61 as rapidly as it is formed, and the larger fragments or particles remaining in the chamber 59 until sufficiently reduced to enter the outlet. Discharge from the chamber of the finely divided material thus formed therein is facilitated by a continuous flow of air through the chamber, the air entering the chamber through the port 79, housing 70, and ports 69 and 65 and centrifugally urged to leave the chamber by the action of the rotating stone 39.

Experience has shown that the depth of the milling chamber 59, the speed of the rotating stone 39, the size of the outlet gap 61, and the amount of material contained in the milling chamber are important factors that have direct bearing upon the effectiveness and efficiency of the machine hereinabove described.

For instance it has been found that if the milling chamber 59 be too shallow, the necessary free circulation of material therein is impaired and, if too deep, the abrasive action is materially reduced. I have found that for general purpose milling the best results are obtainable when the chamber has a substantially uniform depth of three eighths of an inch, although this might be varied somewhat in accordance with the particular size of grain to be milled.

The higher the speed of the lower stone 39, the better, the maximum speed being limited only by the ability of the stone to withstand the internal stresses set up therein by the centrifugal forces resulting from high speed rotation. In the machine shown, the stone 39 is ordinarily driven at about thirty-five hundred revolutions per minute.

The two stones 38 and 39 should be adjusted so as to render the gap 61 as narrow as possible without causing actual contact between the stones at any point during rotation. A gap of about three thousandths of an inch is ordinarily employed.

Figure 3:
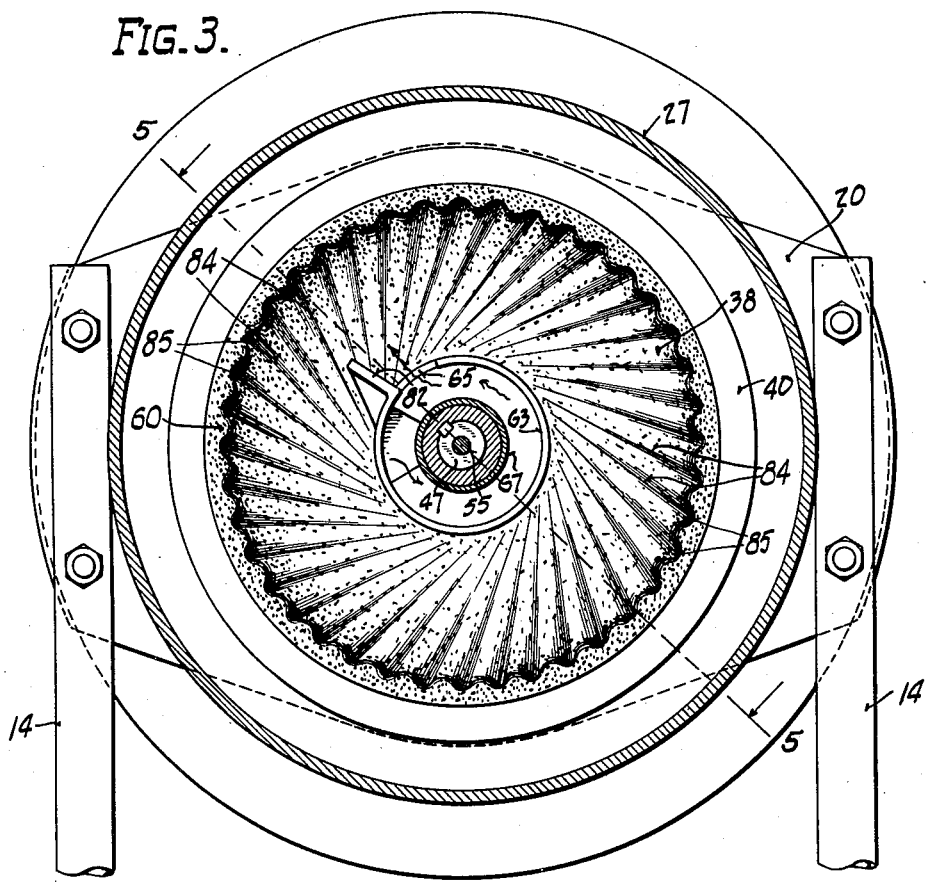
Fig. 3 is a horizontal sectional view, taken substantially along the line 3—3 of Fig. 2, and including a bottom face view of the upper stationary milling stone.
Figure 5:
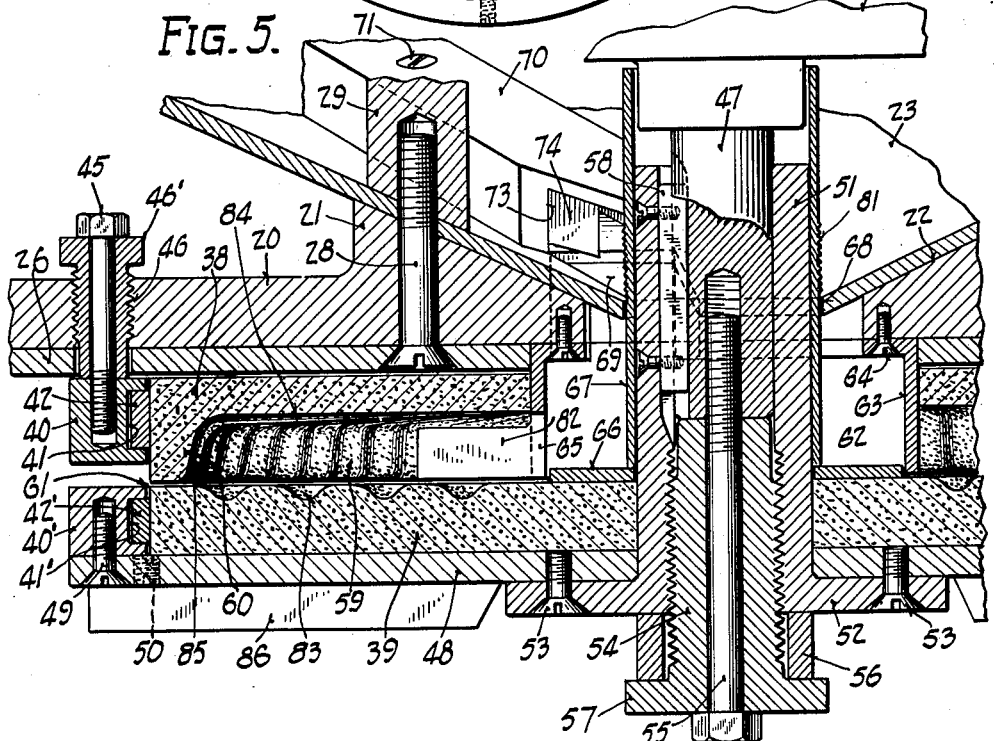
Fig. 5 is a fragmentary vertical sectional view in a radial plane angularly disposed with respect to the sectional plane of Fig. 2 and on a larger scale.

It has been found that a crowded condition of the material within the milling chamber 59 materially reduces the effectiveness and efficiency thereof. The machine shown is therefore equipped with means by which the rate of admission of material to the chamber is controlled by the amount of material in the chamber. For that purpose a stationary baffle blade 82 is provided which projects radially from the housing shell 63 a short distance into the chamber 59, as indicated particularly in Figs. 3 and 5. It will of course be understood that, during operation, the material as a whole circulates about the chamber 59 in the same general direction as the direction of rotation of the stone 39, and that the blade 82 is in position to intercept and arrest some of this circulating material. It will also be noted, particularly from Fig. 3, that the blade 82 is so positioned with respect to the inlet port 65 that the material, so arrested, will tend to accumulate in front of that port and thus somewhat interfere with the admission of material therethrough. This should be clear from inspection of Fig. 3 wherein the material, circulating counterclockwise, tends to accumulate or build up on the right side of the blade 82 in front of the port 65. From the foregoing it will be understood that as the amount of material in the chamber 59 increases the amount accumulated in front of the port 65 increases to thereby decrease the rate of admission of material into the chamber through the port.

The stones 38 and 39 are preferably of a crystalline structure, such as carborundum, the best results being obtainable when a rather course grained structure, such as a No. 20 is employed.

It will of course be understood that the material is urged outwardly by the centrifugal action of the rotating lower stone 39, and although this action is somewhat limited or curbed in the machine shown by the fact that the chamber 59 is disposed almost entirely within the stationary stone 38, yet it is desirable that the centrifugal effect of the rotating stone be further reduced so as to discourage undesirable concentration or crowding of the material within the outer extremity of the chamber. This is accomplished in this instance by fashioning the surfaces of the stones in a manner such as will now be described.

Figure 4:
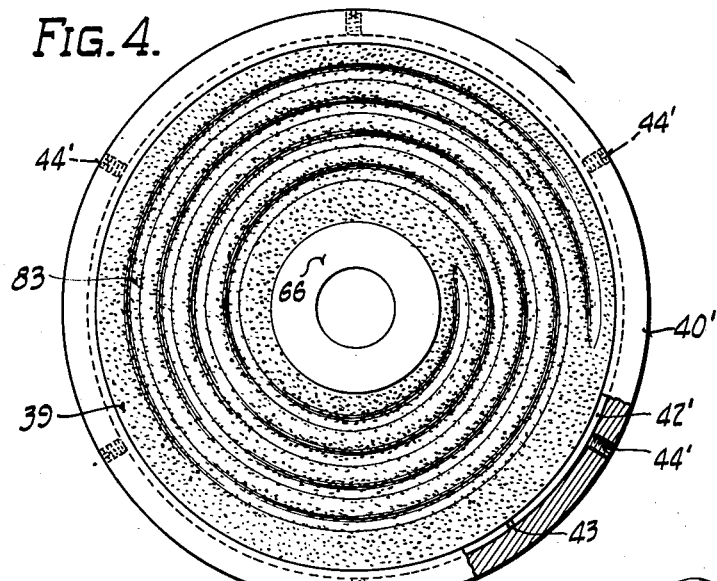
Fig. 4 is a top face view of the lower rotating milling stone.

It will be noted for instance, upon reference particularly to Fig. 4, that a spiral groove 83 is formed on the top face of the lower rotating stone 39 and so curved as to urge the material inwardly upon clockwise rotation of the stone. Also, upon reference to Fig. 3, it will be noted that a series of radially inclined flutes 84 are formed in the under face of the stationary stone 38, these flutes being inclined across the path of the circulating material (counterclockwise in Fig. 3) in such direction as to urge the material toward the center of the chamber 59. The flutes 84 preferably merge into vertical corrugations 85 formed in the encircling peripheral wall 60. The corrugations 85, flutes 84, and spiral groove 83 not only advantageously increase the total effective area of the abrasive surfaces within the milling chamber, but also present those surfaces in positions best suited to intercept and impact with the rapidly moving fragments of the material circulating in the chamber.

Provision is also made in the machine shown for cooling the milling chamber. For this purpose a series of air impeller blades 86 are provided on the under side of the rotating carrier disk 48. The blades 86 cooperate with an adjacent horizontally extended flange 87 on the upper end of an air conducting chamber 88 in a manner to effect outward flow of air across the under surface of the disk. Air is supplied to the chamber 88 preferably through a pair of tubes 89 carried by the ring 31 and open to the atmosphere therethrough. Admission of air to each tube is regulated and controlled by appropriate means, such as slide valves 90, guided in suitable ways 91 provided on the outside of the ring 31. It is of course understood that the cooling air discharged by and from the fan blades 86 is free to escape through the fabric bag 32.

Various changes may be made in the embodiment of the invention hereinabove specifically described without departing from or sacrificing the advantages of the invention as defined in the appended claims.

I claim:

1. A machine for milling grain and the like comprising upper and lower abrasive members having rough surfaces and cooperating to form a relatively shallow laterally extended milling chamber having a non-rotating peripheral wall, and means for rotating the lower of said members at high speed to thereby effect rapid circulation and repeated dashing impingement of the contents of said chamber between and against said surfaces.

2. A machine for milling grain and the like comprising abrasive members having rough surfaces and cooperating to form a relatively shallow laterally extended milling chamber having a non-rotating peripheral wall and a restricted peripheral outlet beneath said wall at the bottom of said chamber, one of said members constituting the bottom of said chamber, and means for rotating said last mentioned member at high speed to thereby effect rapid circulation and repeated dashing impingement of the grain between and against said surfaces, said restricted outlet being of a size to permit only finely divided material to escape from said chamber.

3. A machine for milling grain and the like comprising means forming a relatively shallow laterally extended milling chamber having a non-rotating peripheral wall, a top wall, and a rotatable bottom wall, and means for rotating said bottom wall at high speed to effect free rapid circulation of the contents of said chamber, said walls having rough surfaces reacting on the circulating contents to comminute the same.

4. A machine for milling grain and the like comprising a non-rotating abrasive member recessed to form an upper horizontally extended relatively shallow milling chamber having a relatively narrow non-rotating peripheral wall, a lower abrasive member forming the bottom of said chamber, and means for rotating said lower member at high speed to thereby effect free high speed circulation of the contents of said chamber to thereby effect dashing impingement thereof against the abrasive surfaces of said chamber.

5. A machine for milling grain and the like comprising an upper non-rotating abrasive member recessed to form a horizontally extended relatively shallow milling chamber having a relatively narrow peripheral wall, a lower member having an abrasive surface forming the bottom of said chamber and cooperating with said upper member to form a restricted peripheral outlet substantially coplanar with said surface, and means for rotating said lower member at high speed to repeatedly dash the contents of said chamber against abrasive surfaces of said upper member to comminute the same, said peripheral outlet being restricted to permit only finely comminuted material to escape therethrough.

6. A machine for milling grain and the like comprising upper and lower abrasive members cooperating to form a relatively shallow horizontally extended milling chamber having a non-rotating peripheral wall, and means for rotating said lower member at high speed to effect free rapid circulation of the contents of said chamber, said chamber having abrasive surfaces grooved to increase the total area thereof.

7. A machine for milling grain and the like comprising upper and lower abrasive members cooperating to form a horizontally extended milling chamber having a relatively narrow non-rotating peripheral wall, means for rotating said lower member at high speed to effect free rapid circulation of material within said chamber, said material being centrifugally urged toward said peripheral wall, and formations within said chamber urging said material away from said peripheral wall.

8. A machine for milling grain and the like comprising upper and lower abrasive members cooperating to form a relatively shallow horizontally extended milling chamber having a non-rotating peripheral wall and a restricted peripheral outlet encircling and substantially coplanar with the bottom of said chamber, means for rotating the lower of said members at high speed to effect free rapid circulation of material within said chamber and impingement thereof against the abrasive walls of said chamber to comminute said material, said outlet being restricted to permit discharge of only finely comminuted material therethrough, and means unobstructed by material entering said chamber for admitting atmospheric air to the center of said chamber, the air thus admitted being centrifugally urged by said rotating member to flow toward and through said outlet to thereby facilitate discharge of finely comminuted material from said chamber.

9. A machine for milling grain and the like comprising upper and lower abrasive members cooperating to form a relatively shallow horizontally extended milling chamber having a restricted peripheral outlet, means for rotating said lower member, a hopper above said upper member, said hopper having an inwardly sloping bottom provided with an opening communicating with said chamber, a housing covering said opening and having a port on one side thereof, and a rotating element in said hopper for urging material to enter said port from said hopper.

10. An apparatus for milling grain and like material comprising a material receiving disk having a rough surface rotated at high velocity, and non-rotating means above said disk providing a material confining medium disposed to receive particles of said material thrown from said disk and directing the same back onto said disk to thereby reduce said particles by repeated impact with said disk and medium, said disk being spaced from said non-rotating means to provide a restricted peripheral outlet gap substantially coplanar with said rough surface of said disk.

11. A machine for milling grain and the like comprising abrasive members cooperating to form a milling chamber having a relatively narrow peripheral wall and a restricted peripheral outlet, one of said members being rotatable to effect free circulation of material within said chamber, means including a port for admitting material to said chamber, and abutment means projecting into said chamber from a point adjacent said port for causing the material in said chamber to accumulate adjacent said port in a density greater than the density of material throughout the chamber but varying proportionally therewith to thereby impede admission of material to said chamber and automatically control the same by the amount of material in said chamber.

12. A machine for milling grain and the like comprising upper and lower abrasive members cooperating to form a milling chamber having a non-rotating peripheral confining wall and a restricted peripheral outlet, said milling chamber being of a depth to permit unrestricted movement of grain thereabout, means for effecting high velocity rotation of the lower of said members to effect free circulation of the grain in said chamber, means for admitting grain to said chamber, and means coacting with the grain in said chamber for preventing a crowded condition of grain therein to thereby insure free circulation thereof.

13. A machine for miling grain and the like comprising upper and lower abrasive members cooperating to form a milling chamber having a non-rotating peripheral confining wall and a restricted peripheral outlet, said milling chamber being of a depth to permit unrestricted movement of grain thereabout, and means for effecting high velocity rotation of the lower of said members to effect free circulation of the grain in said chamber, and means for preventing a crowded condition of the grain in said chamber, said last named means including a port for admitting grain to said chamber, and an element projecting into said chamber and coacting with the grain therein to reduce the flow of grain through said port as the amount of grain in said chamber increases.

LAWRENCE E. EGEDAL.